United States Patent [19]

Nukaya

[11] Patent Number: 4,597,572
[45] Date of Patent: Jul. 1, 1986

[54] ORIGINAL SUPPLY APPARATUS FOR USE IN COPYING MACHINE

[75] Inventor: Yasuyuki Nukaya, Tokyo, Japan

[73] Assignee: Ricoh Co., Ltd., Tokyo, Japan

[21] Appl. No.: 649,381

[22] Filed: Sep. 11, 1984

[30] Foreign Application Priority Data

Sep. 16, 1983 [JP] Japan ................. 58-170985

[51] Int. Cl.⁴ .............................. B65H 1/06
[52] U.S. Cl. ................... 271/171; 271/3.1; 271/223; 271/10
[58] Field of Search ............ 271/171, 144, 223, 241, 271/3.1, 4, 10

[56] References Cited

U.S. PATENT DOCUMENTS 3,406,964 10/1968 Eichorn ................. 271/171
4,374,586 2/1983 Lamos ................. 271/171 X
4,469,319 9/1984 Robb ................. 271/171 X Primary Examiner—Richard A. Schacher
Attorney, Agent, or Firm—Flynn, Thiel, Boutell & Tanis

[57] ABSTRACT

An original supply apparatus for use in a copying machine of such a type that an original supplied automatically on a contact glass is located on the basis of one side edge of the contact glass, wherein a carrier roller provided on the upper surface of the contact glass is designed to be movable at a right angle with the travelling direction and this carrier roller is designed, by the action of the interlocking mechanism, to move in the same direction as that of a side guide member in cooperation with the movement of said side guide member provided, to an original tray, movably at a right angle with the travelling direction.

2 Claims, 5 Drawing Figures

ORIGINAL SUPPLY APPARATUS FOR USE IN COPYING MACHINE

BACKGROUND OF THE INVENTION (a) Field of the invention

This invention relates to an original supply apparatus for use in a copying machine of the type wherein an original on a copying machine, in particular on a contact glass is located on the basis of its one side edge and is transported by a carrier roller.

(b) Description of the Prior Art

As the original supply apparatus for the conventional copying machine there has been employed the one as illustrated in FIG. 1, although not limited thereto.

The original supply apparatus illustrated in FIG. 1 is designed so that an original 2 is received in an original tray 1 and a side guide member 20, located movably in the direction perpendicular to the travelling direction of the original, abuts its one side edge to prevent skewing of the original.

The lowermost one of the originals 2 loaded within this original tray 1 is advanced to be copied first and the other originals are supplied in order onto a contact glass 8 by the aid of a supply belt 3, a separating pad 4, supply rollers 5, 6, 7; those originals are carried on the contact glass 8 by a carrier roller 9 provided on a guide plate 14; the front end of each original abuts a stopper 10 in its ascending position; the original is thus stopped; and copying is carried out as predetermined. After the copying is completed, the stopper 10, at a given termination signal is lowered, and the original carried out from the surface of the contact glass 8 by the carrier roller 9 is returned to the uppermost portion of the originals 2 within the original tray 1 by wastepaper rollers 11, 12, 13.

The above mentioned carrier roller 9 is normally disposed on the contact glass 8, specifically at a stationary position on the center line along the travelling direction of originals.

In case the above mentioned original supply apparatus is used in the copying machine of such a type that the original is carried on the basis of the center line along its travelling direction, as the carrier roller is always in abutment with the center line portion of the original irrespective of the size of the original and an equal delivery force is given either side of the center line of the original, there is no peril that carrying of originals is subject to a particular hindrance.

However, in case the copying machine is of such a type that locating is done on the basis of one side edge of the original and so as to coincide with one side edge of the contact glass, the above mentioned original supply apparatus is disadvantageous in that the carrier roller comes to abut the location eccentric relative to the center line of the original surface depending on the size of the original, and consequently there is caused a difference in the delivery force for the carrier roller between the right and left of the center line of the original and the original becomes skew.

In order to eliminate the above mentioned drawbacks, there is also proposed the conventional original supply apparatus wherein the carrier roller is disposed so that its travelling direction may be angled relative to the center line of the contact glass; one side edge on which the contact glass is based is provided with a side stopper at a right angle to the stopper for stopping the original; and the carrier roller conveys the original in the direction slanting towards the corner portion defined by said stopper and said side stopper.

However, this original supply apparatus is defective in that when the original is thick and stiff there is no particular difficulty encountered, but when the original is thin and lacks stiffness, it is liable to be crumpled and folded.

SUMMARY OF THE INVENTION

The object of this invention is to provide an original supply apparatus which is capable of eliminating the inherent drawbacks in the original supply apparatus used in a copying machine of such a type that the original is located on the basis of one side edge of the original and locating a carrier roller at the center of the original irrespective of the size of the original to be supplied.

Said object can be achieved by providing an original supply apparatus for use in a copying machine according to this invention, wherein an original tray is provided with a side guide member movable at a right angle to the travelling direction of the original; a carrier roller is provided on the upper surface of a contact glass movable at a right angle to the travelling direction of the original; this carrier roller is allowed to move in the same direction as the side guide member in cooperation with the movement of said side guide member; and thus an interlocking mechanism is provided which allows the carrier roller to locate always at the center of the original.

DETAILED DESCRIPTION OF THE INVENTION

Figure 2:
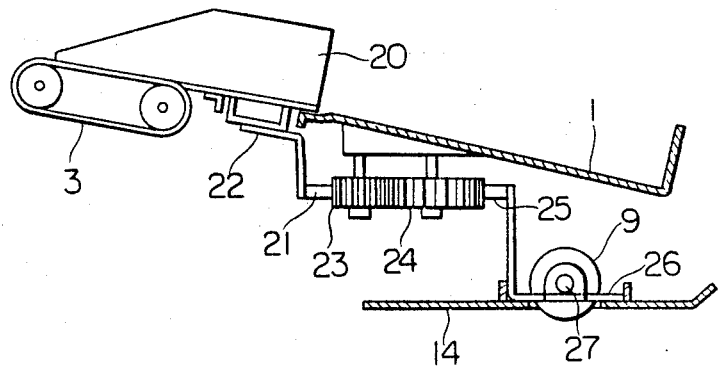
FIG. 2 is a vertical section illustrating the main part of the preferable example of the original supply apparatus according to this invention.

The drawings on and after FIG. 2 illustrate preferable examples of the original supply apparatuses for copying machines according to this invention.

Figure 1:
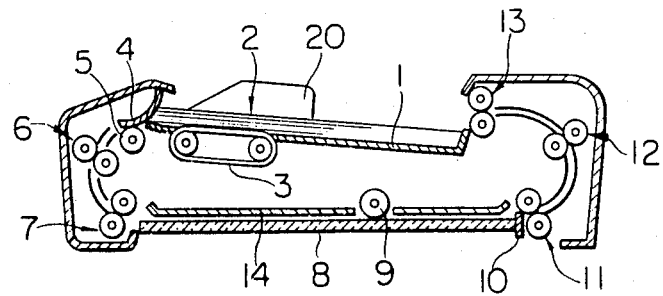
FIG. 1 is a vertical section illustrating the conventional known original supply apparatus of such a type as the original tray is provided movably with the side guide member and the original is located on the basis of one side edge of the contact glass.

The same numerals will be attached to the common portions in these drawings as those of the conventional apparatus shown in FIG. 1 for explanatory purposes.

Figure 3:
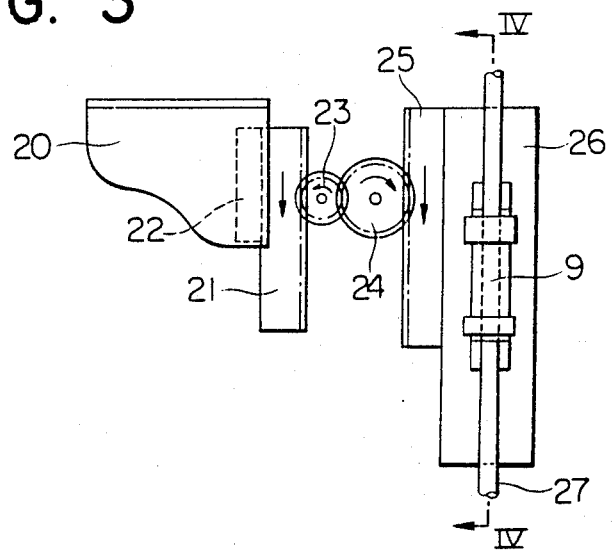
FIG. 3 is a plan view of the device shown in FIG. 2.
Figure 4:
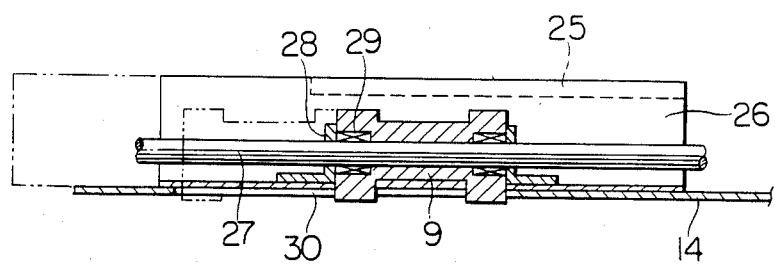
FIG. 4 is a partial sectional view cutaway along line IV–IV of FIG. 3 in the direction of arrows.

In FIG. 2 and FIG. 3, a rack 21 extending horizontally is provided on the back of a side guide member 20 through a support member 22, a pair of meshing gears 23, 24 are rotatably supported on the back of an original tray 1, the gear 23 meshes with the rack 21 and at the same time the gear 24 meshes with the rack 25, and this rack 25 is attached to a support member 26 of a carrier roller 9. The carrier roller 9, as detailed in FIG. 4, is axially movably disposed in an opening 30 formed in an upper guide plate 14 on a rotary shaft 27 passing through a pair of support plates 28 provided on the support members 26 through a one-way clutch 29. The rotary shaft 27 is rotated by a known non-illustrated driving member. The gear ratio of toothed wheel 23 to toothed wheel 24 is 1:2.

Figure 5:
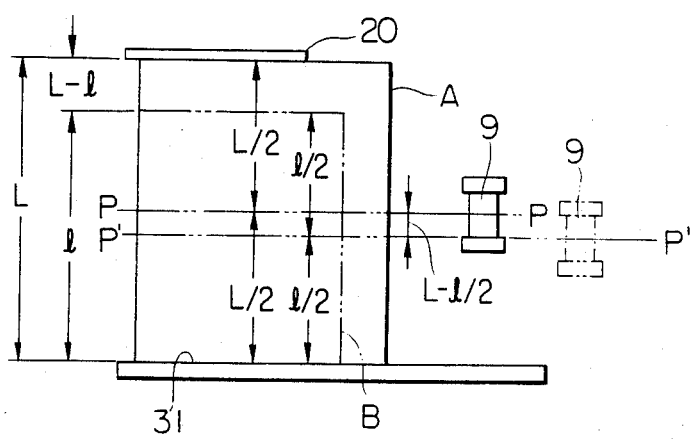
FIG. 5 is a view illustrating the operating state of the side guide member and the carrier roller.

Next, explanation will be made on the operating state of side guide member and carrier roller of said original supply apparatus with reference to FIG. 5.

A denotes a large-sized original and B denotes a small-sized one.

A carrier roller 9 is disposed so that its center line is located on the center line P—P of the original A having a width of L. When the original B having a width of l is received in an original tray in place of the original A, a side guide 20 is moved by the distance of L-l towards a standard line 31. This movement is transmitted to the carrier roller 9 through rack 21 to toothed wheels 23, 24 and rank 25, the carrier roller is moved from the solid line position shown in FIG. 4 to the chain-lined position. By so doing, the center of the carrier roller 9 moves to the center line P'-P' displaced by the distance L-l/2 from the above mentioned position. This center line P'-P' is the center line of the original B.

In the contrary case, that is, when the guide 20 is moved to accommodate original A the carrier roller 9 moves from the line P'—P' towards the line P—P.

With the movement of the side guide member 20 in compliance with changes in the size of the original, the carrier roller 9 moves automatically to a place where its central line always coincides substantially with the central line of the original through interlocking mechanisms 21, 23, 24, 25.

Thus, the carrier roller is arranged to coincide with the central line of the original and consequently the delivery force comes to exert equally on either side of the central line of the original.

Although a particular preferred embodiment of the invention has been disclosed in detail for illustrative purposes, it will be recognized that variations or modifications of the disclosed apparatus, including the arrangement of parts, lie within the scope of the present invention.

What is claimed is:

1. In a copying machine comprising a tray for holding documents to be copied, an adjustable side guide member associated with said tray and movable laterally with respect thereto for adjustment to accomodate documents of different sizes, a contact glass for receiving a document from said tray and supporting the document for copying and a carrier roller for moving the document along said contact glass, the improvement which comprises; means supporting said carrier roller for lateral movement with respect to said contact glass in the same direction as said side guide member moves with respect to said tray, and an interlocking mechanism for effecting point movement of said carrier roller and said side guide member so that said carrier roller is always located at the center of the document on said contact glass, said interlocking mechanism including first and second gears rotatably mounted on the underside of said tray and meshed with each other for simultaneous rotation, a first rack coupled to said side guide member for movement therewith in response to lateral movement of said side guide member, said first rack being meshed with said first gear so that said first gear is rotated and thereby said second gear is rotated when the position of said side guide member is adjusted, and a second rack meshed with said second gear and coupled to said carrier roller so that rotation of said second gear caused by lateral movement of said guide member causes lateral movement of said carrier roller 2. A copying machine as claimed in claim 1 in which the gear ratio of said first gear to said second gear is 1:2.

* * * * *